No. 797,774. PATENTED AUG. 22, 1905.
C. E. LORD.
SYSTEM OF MOTOR CONTROL.
APPLICATION FILED APR. 12, 1905.

Witnesses
J. Ellis Glen
Allen Oxford

Inventor
Charles E. Lord
by Albert G. Davis
Atty.

UNITED STATES PATENT OFFICE.

CHARLES E. LORD, OF CINCINNATI, OHIO, ASSIGNOR TO GENERAL ELECTRIC COMPANY, A CORPORATION OF NEW YORK.

SYSTEM OF MOTOR CONTROL.

No. 797,774. Specification of Letters Patent. Patented Aug. 22, 1905.

Application filed April 12, 1905. Serial No. 255,173.

*To all whom it may concern:*

Be it known that I, CHARLES E. LORD, a citizen of the United States, residing at Cincinnati, county of Hamilton, State of Ohio, have invented certain new and useful Improvements in Systems of Motor Control, of which the following is a specification.

My present invention relates to systems of motor control, and especially to systems of control for a plurality of motors mounted upon the several cars of a train, said motors being under the control of a plurality of pneumatically-operated controllers.

In systems of multiple-unit train control it is advisable to have as small a number of through-train connections as possible in order to reduce the time and labor required to couple and uncouple the several cars of the train and to reduce the complications and thereby the possibility of damage due to accidental disarrangement of the control system. It is also quite desirable to permit the motors to be accelerated by an automatic progressive operation of the motor-controller elements, while at the same time leaving the control of the extent and rate of this progressive operation largely in the hands of the motorman or operator.

The object of my invention is therefore to embody the desirable features above enumerated in a simple, compact, and easily-controlled pneumatically-operated system of motor control and particularly a system of multiple-unit train control.

In one of its aspects my invention consists of a system of control for a plurality of motors, comprising a series-parallel motor-controller made up of a plurality of individual pneumatically-actuated contacts arranged to be actuated in automatic succession and a pneumatically-actuated reversing-switch, together with a master controlling device which is connected to the actuating means of the contacts and the reversing-switch by two pipes and which regulates the admission of compressed air to the pipes, so that series and parallel connections for the motor for forward and reverse rotation may be obtained.

In another of its aspects the present invention may be considered as a system of control for a plurality of motors, comprising a motor-controller made up of a plurality of individual pneumatically-actuated contacts arranged to be actuated in automatic succession, means controlled by the contact-actuating means for maintaining the contacts closed, means for controlling the admission of compressed air to said operating means, and means for checking the automatic progression of the contacts.

In another aspect the present invention may be considered as a motor-control system comprising a motor-controller made up of a plurality of separately-actuated contacts having pneumatic operating means, a pneumatic actuating system connected therewith, and pneumatic means for maintaining the contacts after the pressure in the actuating system has been reduced, so as to render the operating means inoperative.

In another of its aspects the present invention relates to an improved switch operating and controlling mechanism comprising an operating-piston and means for increasing the effective area of the piston as the switch is operated, whereby the switch may be maintained in its operative position with less pressure than is required to operate it.

In another of its aspects the present invention comprises a system of train control in which each of a plurality of cars is provided with a motor-controller made up of a plurality of separately-actuated contacts having pneumatic actuating means, together with means for producing an automatic progressive operation of said actuating means, in combination with a pneumatic train system including but two train-pipes and a master-valve, all constructed and arranged so that the rate of progression of the contacts may be directly controlled from the master-valve.

In another of its aspects the present invention comprises a system of train control in which each of a plurality of cars has a motor-controller made up of a plurality of separately-actuated contacts, a piston for operating each contact, means for producing an automatic progression of the contacts, and means for increasing the area of each piston as its contact operates, together with train-pipes operatively related to the contact-operating means and a master-valve for controlling the supply of air from the source of supply to the train-pipes, the master-valve being also provided with means for partially exhausting the train-pipe to check the automatic progressive operation of the contacts at any desired point.

The present invention in these and other aspects will be more fully understood in connection with the following detailed description.

In the accompanying drawings, which illustrate the preferred embodiment of my invention.

Figure 1:
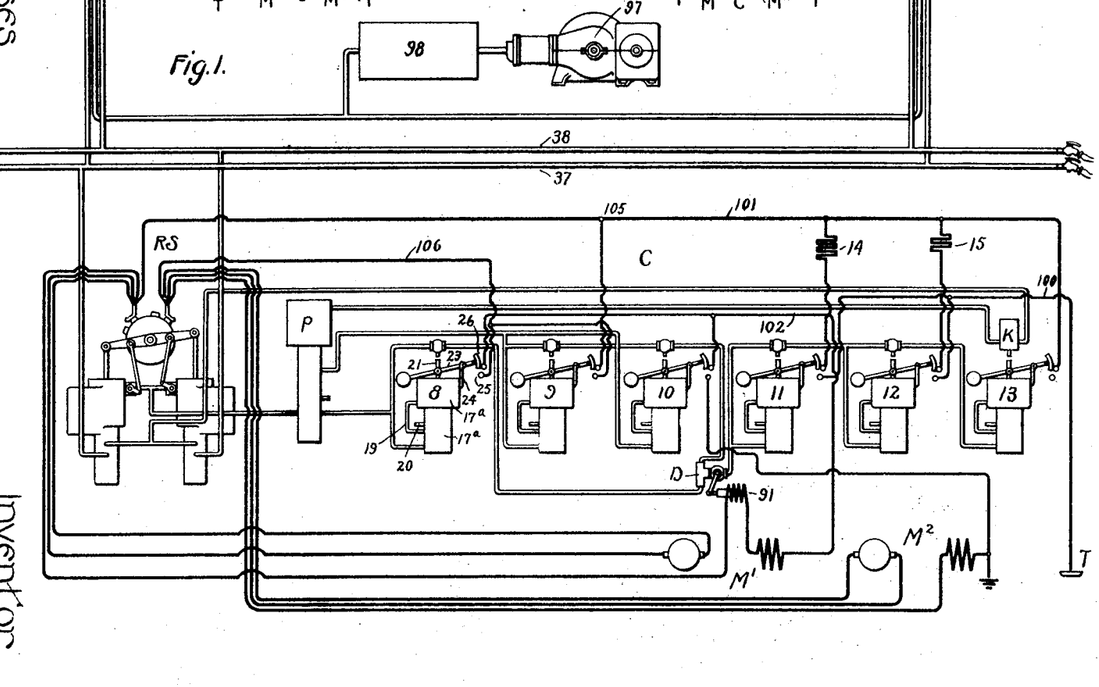
Figure 1 is a diagrammatic representation of so much of the equipment of a single car in a system of train control as is necessary to properly illustrate my invention.

Referring now to the drawings, the motor-controller C consists of a plurality of pneumatically-operated contacts 8 to 13, inclusive, controlling the connections of the motors $M'$ and $M^2$. The contact 8 controls the series connections of the motors, the contacts 9 and 10 control the parallel connections, and the remaining contacts 11, 12, and 13 control the sections of the resistance 14 and 15, which are connected in the motor-circuit when the motors are in series or parallel relationship. Any number of resistance-controlling contacts may be employed, depending merely upon the number of resistance steps desired. Each controller-contact is provided with pneumatic operating means and with pneumatic maintaining means. The operating means consists of the piston 16, contained within the cylinder 17. The maintaining means is here illustrated as a piston $16^a$ of larger diameter than the piston 16 and operating in the enlarged cylinder $17^a$. The admission of air to the cylinder $17^a$, though it may be controlled by an independent valve, is preferably controlled by the operating-piston 16 and is here shown as consisting of the pipe connection 19, normally exhausted to atmosphere through the exhaust-port 20 and the passage-way 18 in piston 16. When air is admitted to cylinder 17, the piston rises against the action of spring 22, the exhaust communication at 18 is cut off, and an open passage-way is formed between the cylinder 17 and cylinder $17^a$.

The mechanism just described constitutes the means for increasing the effective area of the operating-piston 16 so that the contact may be maintained in its operated position with much less pressure than is required to operate it. The pistons 16 and $16^a$ are rigidly connected and have attached thereto the piston-rod 21, to which is pivoted the movable contact-arm 23 of the controller contact or switch. This arm 23 is pivotally mounted on the cylinder $17^a$ at 24 and carries the bridging member 26, adapted to bridge the relatively fixed contacts 25 in the motor-circuit. The means employed for producing the automatic progressive operation of the controller-contacts will be hereinafter described.

The reversing-switch RS comprises the cylindrical member 27, carrying contact-segments engaging with relatively fixed contact-fingers. The pneumatic operating means is connected to this cylindrical member through the lever-arm 28, to the opposite ends of which are pivoted the piston-rods 29 and 30, respectively, the rod 29 being connected to piston 31, operating in cylinder 33, and the rod 30 being connected to piston 32, operating in cylinder 34. Said cylinders are in communication with the train-pipes 37 and 38 through the connecting-pipes 35 and 36, respectively. Located in the connecting-pipe 35 is the cut-off valve 51 and also the quick-acting exhaust-valve 39. Located in connecting-pipe 36 is the cut-off valve 52 and also the quick-acting exhaust-valve 40. The quick-acting exhaust-valves each comprise a piston 41, operating in cylinder 42, held in the position shown in Fig. 3 by spring 43 and normally permitting the cylinder 33 or 34 to be in communication with atmosphere through the ports 44 and 45. The pistons 31 and 32 control ports in the upper part of each cylinder 33 and 34, said ports communicating with pipe 46, leading to the controller-contact-operating means. These ports are also controlled by the slide-valves 47 and 48, which are operated through the links 49 and 50, respectively, connected to the lever-arm 28. These last-mentioned valves are so adjusted that, considering valve 48, communication is established between the cylinder 34 and pipe 46 when the port leading to said pipe is uncovered by the piston 32 during its upward movement, but said connection is cut off when said port is uncovered during the downward movement of said piston 32. The cut-off valve 52 is operated by the engagement of piston 32 during its downward movement with the projecting valve-spindle 55 and operates to cut off the communication of pipe 36 with cylinder 34 through port 53 and establishes communication between said pipe 36 and pipe 56 through passage-way 54. The cut-off valve 51 is provided with similar passages, which perform similar functions with respect to pipe 35.

Figures 3, 4, 5:
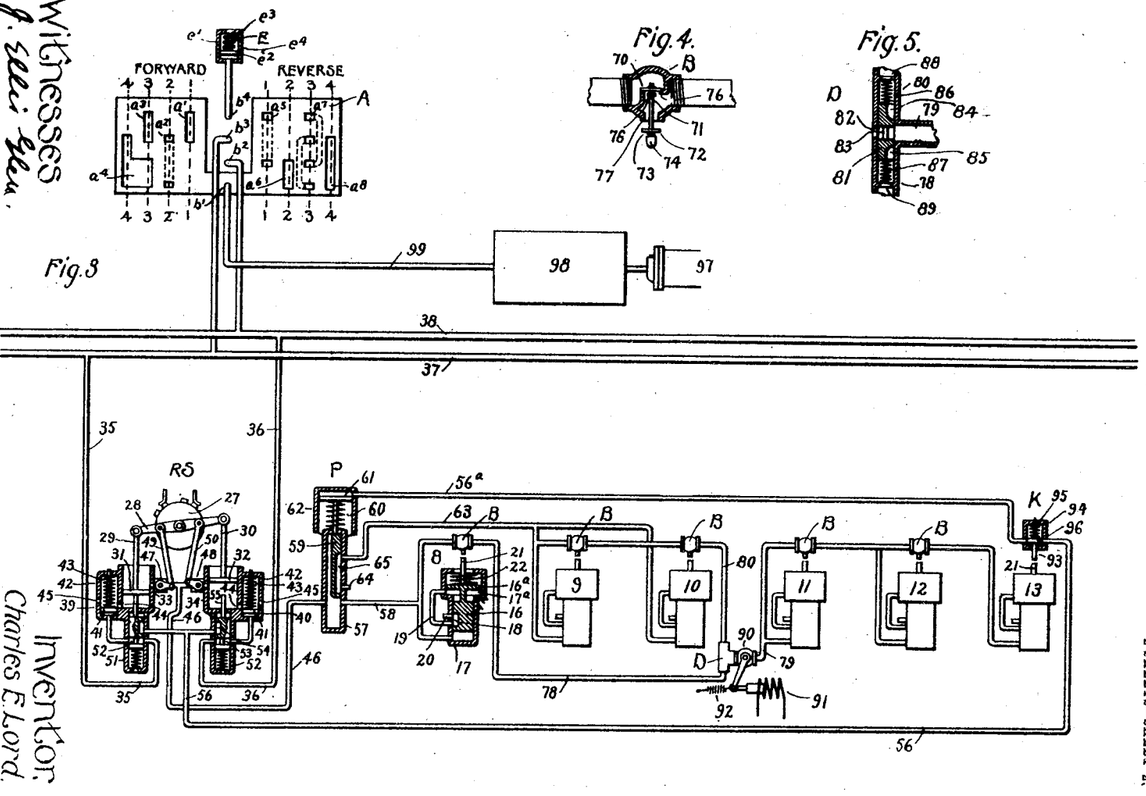
Fig. 3 is a simplified diagram of the pneumatic control system illustrated in Fig. 1, the motor-circuits being omitted.
Fig. 4 is a section through one of the mechanically-operated valves controlling the automatic progressive operation of the controller-contacts.
Fig. 5 is a sectional view through the double-throw automatic valve controlling the connections to the operating means of the resistance-controlling contacts.

The pipe 46 leads to the casing of the parallel controlling-valve P, and the pipes 56 and $56^a$ lead to its operating means. The valve P controls the admission of compressed air to the parallel-contact-operating means. This valve normally, as shown in Fig. 3, permits the pipe 46 to be connected, through its casing 57, to the pipe 58, leading to the operating means of the series contact 8. The slide-valve 59, contained within the casing 57, is normally maintained at one end of its movement by means of the spring 60 bearing against the operating-piston 61, contained within the cylinder 62. The valve is moved to the other end of its travel by compressed air admitted to cylinder 62 through pipe 56$^a$. The pipe 63, leading to the operating means of the parallel contacts 9 and 10, is normally connected to atmosphere through the exhaust-port 64 and the passage-way 65 in valve 59.

When the controller-contact has operated, it actuates a valve B in the pneumatic actuating system, said valve admitting compressed air to the operating means for the next contact in advance, thus producing a progressive operation of the controller-contacts, and hence an automatic acceleration of the motors controlled by said contacts. I prefer to employ for this purpose such a double valve as shown in section in Fig. 4. This valve B comprises the internal valve 70, loosely mounted on valve-spindle 71 and held upon its seat 76 by gravity, assisted by the pressure in the pipe when such pressure exists. Said valve is lifted from its seat by the engagement of collar 76 therewith during the upward movement of valve-spindle 71. The external valve 72, also loosely mounted on spindle 71, is normally open, exhausting to atmosphere the cylinder of the next contact in advance. This valve is moved to its seat 77 and held firmly thereon by the compression of the spring 73 during the upward movement of spindle 71. In the closed position of valve 72 the collar 74 practically engages therewith, precluding any possibility of said valve opening due to pressure within the pipe so long as the piston-rod 21 of the controller-contact-operating means remains in engagement with valve-spindle 71 and the controller-contact is completely closed. The valve 72 is arranged to close before valve 70 opens and valve 70 to close before valve 72 opens.

When the series contact 8 operates, the compressed air is admitted through the valve B, operated by the operating means of said contact, to the pipe 78, leading to the pipe 79, communicating with the resistance-controlling contact-operating means. When the parallel contacts 9 and 10 are operated, the compressed air is admitted through valves B, operated thereby, to pipe 80, leading also to pipe 79. It is necessary with such connections to prevent the compressed air in pipe 78, when the motors are connected in series, entering pipe 80. If the air should enter pipe 80 from pipe 78, the pipe 78 would be exhausted directly to atmosphere and the resistance controlling-contacts would not be operated. To prevent this condition, I provide at the junction of pipes 78, 79, and 80 an automatic double-acting valve D, the preferred form of which is shown in section in Fig. 5. This valve consists of the piston 81, provided with the passage-way 82, which normally registers with the port 83 in the valve-casing and exhausts the pipe 79 to atmosphere. The valve is normally held in the position shown in Fig. 5 by means of the springs 86 and 87, located between the valve ends and the collars 88 and 89, fastened to the valve-casing. If pressure exists in pipe 78, the piston 81 is moved upwardly, compressing spring 86, closing port 83, and connecting pipe 78 with pipe 79 through passage-way 85. Also if pressure exists in pipe 80 the piston 81 is forced downwardly, compressing spring 87, closing port 83, and connecting pipe 80 with pipe 79 through passage-way 84. It will thus be seen that the passage-way between pipes 78 and 80 is effectively blocked without affecting the desired communications between pipes 78 and 79 during the operation of the controller.

To check the automatic progressive operation of the controller-contact-operating means when the current in the motor-circuit rises above a predetermined value, I provide a throttle-valve 90 in pipe 79, maintained normally open by spring 92 and closed to reduce or cut off the supply of air to the resistance-contact-operating means by the solenoid 91, connected in the motor-circuit, as shown in Fig. 1.

To prevent the parallel valve P from operating unless the controller-contacts have first passed through their series combinations, I provide the valve K, which is mechanically operated by the piston-rod 21 of the last resistance controlling-contact 13. Said piston-rod strikes against the valve-spindle 93 and moves the piston 96, contained within the casing 94, upward against spring 95 to open the passage-way through said casing normally blocked by said piston.

The master controlling devices or master controlling-valves are illustrated in Fig. 1 at C' and C$^2$. These controlling-valves may be located at any desired point or points on the car or train. The master-valves control the communications between the train-pipes 37 and 38 and the source of compressed-fluid supply, here illustrated as a motor-driven air-compressor 97, connected to reservoir 98. In Fig. 1 these valves are shown as rotary disk valves operated by the handles $h$. In the simplified form (illustrated in development in Fig. 3) the valve comprises a slidable plate A, in which are formed the passage-ways $a'$ to $a^3$, inclusive, said passage-ways being adapted to register with the ports $b'$, $b^2$, $b^3$, and $b^4$ in a manner to be hereinafter described. Connected with port $b^4$ is the pressure-reducing valve E, which governs the degree of reduction of pressure in the pneumatic actuating system when it is desired to check the automatic progression of the contact-operating means. This valve E consists of the piston-valve $e^2$, which operates within the casing $e'$ and is normally maintained, by means of spring $e^3$, in a position to cut off the communication between the port $b^4$ in the master-valve and the exhaust-port $e^4$ in the valve-casing $e'$. This valve E is preferably set to reduce the pressure in the train-pipes but a few pounds below the pressure of the supply.

Figure 2:
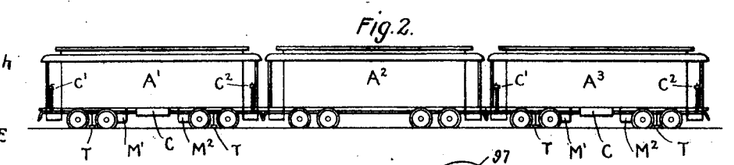
Fig. 2 represents diagrammatically a train of three cars equipped with my improved system of control.

Of the three cars A', A², and A³ shown in Fig. 2 the cars A' and A³ are motor-cars, the position of the motor-controllers being preferably at C, the master-controllers at C' and C², the motors at M' and M², and the trolley or collector shoe at T.

In the operation of the system of motor control herein illustrated and described let us consider that the master controlling-valve C' is moved into its first operative position in one direction, (indicated by the dotted vertical line 2 2, "Forward," Fig. 3.) The ports $b'$ and $b^3$ and the passage-way $a^2$ are thus brought into register, and compressed air is admitted from the source of supply 97 and reservoir 98 into train-pipe 37, from which it flows into the reversing-switch-operating mechanism, thence to the operating means of the series contact 8 and resistance-contacts 11, 12, and 13 in succession, operating the reversing-switch and said contacts to connect the motors in series for forward direction of movement and then to cut the resistance-sections out of said circuit step by step to produce an automatic acceleration of the motors. The course pursued by the compressed air may be traced as follows: from reservoir 98, through pipe 99, port $b'$, passage-way $a^2$, port $b^3$, pipe $37^a$, train-pipe 37, connecting-pipe 35, through passage-way 52 in cut-off valve 51, through quick-acting exhaust-valve 39 into cylinder 33, moving piston 31 to operate the reversing-switch drum 27, thence through slide-valve 47, pipe 46, valve-casing 57 of parallel valve P, thence through pipe 58 to cylinder 17 of series contact 8 operating said contact, thence through valve B, which is opened by the operation of series contact 8 through pipe 78, valve D, throttle-valve 90, operating cylinder of contact 11, which in turn operates its valve B to admit the air to the operating means of contact 12, &c. As the piston 16 of contact 8 moves upward the port leading to pipe 19 is uncovered thereby, and the air is admitted to the enlarged port $17^a$ of the cylinder and acts upon the piston $16^a$, which requires less pressure to maintain the contact in its operated position than is required to move it into its operated position when acting against piston 16 alone. This operation takes place in each of the resistance-contact-operating means. When it is desired to check the automatic progressive action of the controller-contacts from the master controller, the latter is moved back to the position indicated by 1 1, "Forward." The supply of compressed air is thus cut off from the train-pipe 37, and said train-pipe is connected to the pressure-reducing exhaust-valve E through the port $b^3$, passage-way $a'$, and port $b^4$. This reduction in pressure in the actuating system prevents the operation of any advance contacts, but permits the contacts already operated to remain in their operated position. With the master controlling-valve in the position 2 2, "Forward," and the motor-controller contacts in the first series position the circuit through the motors may be traced on Fig. 1 as follows: from trolley or collector shoe T, conductor 100, first resistance-controlling contact 11, resistance-section 14, conductor 101, reversing-switch RS, armature of motor M', reversing-switch, throttle-valve solenoid 91, field-coil of motor M', conductor 102, series contact 8, reversing-switch RS, armature of motor M², reversing-switch and field of motor M², to ground or return. As the contact 12 operates the resistance-section 15 is thrown in parallel with resistance 14 in the motor-circuit, thus reducing the resistance of said circuit. The operation of the final resistance-controlling contact 13 short circuits the resistance-sections and leaves the motors directly connected in series without external resistance. If the automatic progressive action of the resistance-controlling contacts becomes too rapid and the current in the motor-circuit rises above a predetermined value, the solenoid 91 operates the throttle 90 against the action of spring 92 and cuts down the supply of air to the contact-operating means. If it is desired to connect the motors in parallel relationship, the master controlling-valve C' is moved rapidly into the position indicated by 4 4, "Forward," thereby connecting both train-pipes 37 and 38 to the source of compressed-air supply through the passage-way $a^4$. The compressed air admitted to train-pipe 38 through port $b'$, passage-way $a^4$, port $b^2$, and pipe $38^a$ flows through pipe 36, thence through passage-way 54 in cut-off valve 52, (said valve having been moved downward by the operation of the reversing-switch,) thence through pipe 56, valve K, (which has been mechanically operated by the operating means of contact 13 and is now maintained in its open position by the pressure in pipe 56,) thence through pipe $56^a$ into the cylinder 62 of parallel valve P, moving said valve downward against the action of spring 60. As the valve P operates the pipe 58 is first cut off from pipe 46. Then said pipe 58 is exhausted to atmosphere through passage-way 65 in said valve and the exhaust-port 64. This exhausts the air from cylinder 17 of series contact 8 and also from pipe 78 and permits contact 8 to open and the valve D to assume its mid-position. The latter exhausts pipe 79 through ports 82 and 83 in said valve, thus permitting the resistance-controlling contacts to open approximately simultaneously. The rapidity of opening of these contacts is increased by the fact that all the air in the operating-cylinders need not pass through the ports 82 and 83 in valve D;

but the exhaust-ports of valves B of the contacts are opened immediately to permit the air from the cylinder of the advance contact to exhaust therethrough. As each contact opens the passage-way 18 in cylinder 16 is brought into register with pipe 19 and exhaust-port 20, and the air in cylinder $17^a$ is exhausted to atmosphere. This also increases the rapidity of opening of the contacts. The controller-contacts are now all open; but the valve P continues its downward movement and in so doing brings the pipe 46 into communication with pipe 63 through valve-casing 57. The compressed air then flows through pipe 63 into cylinders 17 of parallel contacts 9 and 10, closing said contacts, and they then operate their valves B to admit air into pipe 80. The valve D is then automatically operated to connect pipe 80 with pipe 79, and the air passes through said valve D and valve 90 into pipe 79 and operates the resistance-controlling contacts in automatic progression, as before described. The throttle-valve 90 operates, as before described, to check a too rapid progression of the controller-contacts. This automatic progression may also be checked from the master-controller without affecting the contacts already operated. This is accomplished by moving the master-valve back into the position indicated by 3 3. In this position the pressure is maintained in the train-pipe 38 and its connections, while the pressure in train-pipe 37 and its connections is slightly reduced through the passage-way $a^3$ and pressure-reducing valve E.

The circuits through the motors corresponding to the first parallel position of the motor-controller with contacts 9, 10, and 11 operated may be traced on Fig. 1 as follows: from trolley or collector shoe T, through conductor 100, contact 11, resistance 14, conductor 101, reversing-switch, armature of motor M', reversing-switch, solenoid 91, field of motor M', conductor 102, through contact 10 to ground or return, also branching from conductor 101 at point 105 through contact 9, conductor 106, reversing-switch, armature of motor $M^2$, reversing-switch and field of motor $M^2$ to ground or return. As the resistance-controlling contacts operate the resistance of the motor-circuit is reduced step by step until upon the operation of the final contact 13 the motors are connected in parallel without external resistance. When the master controlling-valve C' is moved into it mid-position, the train-pipes are exhausted, thus permitting all parts of the system throughout the car or train to assume their initial positions. When it is desired to operate the car or train in the opposite direction, the compressed air is admitted to train-pipe 38 to obtain series connections and thereafter into both pipes 37 and 38 to obtain parallel connections. This is accomplished by moving the master-valve into its "Reverse" position. In view of the foregoing description the operation of the various parts of the system for this reverse direction of movement will be readily traced on the figures. If the master-controller is thrown at once from its mid or "off" position into its final position, either forward or reverse, the control system will operate automatically to connect the motors first in series with resistance in circuit therewith, then cut out said resistance step by step, then automatically open the motor-circuit, then reëstablish said circuit with the motors connected in parallel with resistance in circuit, then cut said resistance out of circuit step by step, leaving the motors connected in parallel. This automatic progression may be checked at any desired point without affecting the contacts already operated, said checking being effected by a slight manipulation of the master-valve.

Many changes and modifications may be made in the arrangement of the system and the construction of parts thereof as hereinbefore described without departing from the spirit of the invention, and I aim in the appended claims to cover all such changes and modifications.

What I claim as new, and desire to secure by Letters Patent of the United States, is—

1. In a system of motor control, a plurality of motors, a series-parallel motor-controller comprising a plurality of separately-actuated contacts, pneumatic operating means for said contacts, means for producing an automatic progressive operation of said operating means, a pneumatically-operated reversing-switch, two pipes connected to the reversing-switch-operating means and the contact-operating means, a master controlling device for regulating the admission of compressed air to said pipes so that series and parallel connections of the motors in forward and reverse direction of rotation may be obtained, and means operatively related to the master controlling device for checking the automatic progressive operation of the contacts without affecting the contacts already operated.

2. In a system of motor control, a plurality of motors, a series-parallel motor-controller comprising a plurality of separately-actuated contacts, pneumatic operating means for said contacts, means for producing an automatic progressive operation of said operating means, a pneumatically-operated reversing-switch, two pipes connected to the reversing-switch-operating means and the contact-operating means, a master controlling device for regulating the admission of compressed air to said pipes so that series and parallel connections of the motors in forward and reverse direction of rotation may be obtained, and means for reducing the pressure in said pipes a predetermined amount to check the automatic progressive operation of said contacts without affecting the contacts already operated.

3. In a system of motor control, a plurality of motors, a motor-controller comprising a plurality of separately-actuated contacts including resistance-controlling contacts, pneumatic operating means for said contacts, means for producing an automatic progressive operation of said contact-operating means, means controlled by the contact-operating means for maintaining said contacts, and means for controlling the admission of compressed air to said operating means.

4. In a system of motor control, a plurality of motors, a motor-controller comprising a plurality of separately-actuated contacts including resistance-controlling contacts, pneumatic operating means for said contacts, means for producing an automatic progressive operation of said contact-operating means, means controlled by the contact-operating means for maintaining said contacts, means for controlling the admission of compressed air to said operating means, and means for checking the automatic progression of said contacts.

5. In a system of motor control, a plurality of motors, a motor-controller comprising a plurality of separately-actuated contacts including resistance-controlling contacts, pneumatic operating means for said contacts, means for producing an automatic progressive operation of said contact-operating means, means controlled by the contact-operating means for maintaining said contacts, a master controlling device for regulating the supply of compressed air to said operating means, and means for exhausting a predetermined part of the air admitted to the operating means to check the automatic progression of the contacts.

6. In a motor-controller of the separately-actuated-contact type, resistance-controlling, series and parallel contacts, with pneumatic operating means therefor, a valve for controlling the admission of air to the series and parallel contact operating means, and a mechanically-operated, pneumatically-maintained valve for controlling the operation of said first-mentioned valve.

7. In a motor-controller of the separately-actuated-contact type, pneumatically-operated resistance-controlling, series and parallel contacts, a pneumatically-operated reversing-switch, a pneumatically-operated valve for controlling the admission of compressed air to the series and parallel contact operating means, and valves operatively related to the reversing-switch-operating means for controlling the admission of air to the operating means of the pneumatically-operated valve.

8. In a motor-controller of the separately-actuated-contact type, pneumatically-operated resistance-controlling, series and parallel contacts, a pneumatically-operated reversing-switch, a pneumatically-operated valve for controlling the admission of compressed air to the series and parallel contact-operating means, valves operatively related to the reversing-switch-operating means for controlling the admission of air to the operating means of the pneumatically-operated valve, and a valve operatively related to one of the resistance-controlling contact-operating means, also controlling the admission of air to the operating means of the pneumatically-operated valve.

9. In a series-parallel motor-controller of the separately-actuated-contact type, pneumatically-operated contacts, a pneumatically-operated reversing-switch, a pneumatic actuating system, means controlled by the operating means of the reversing-switch for rendering said actuating system operative as to the series contacts, a pneumatically-operated valve for rendering said actuating system operative as to the parallel contacts, and means controlled by the reversing-switch-operating means for controlling the operation of said pneumatically-operated valve.

10. In a series-parallel motor-controller of the separately-actuated-contact type, pneumatically-operated contacts, a pneumatically-operated reversing-switch, a pneumatic actuating system, means controlled by the operating means of the reversing-switch for rendering said actuating system operative as to the series contacts, a pneumatically-operated valve for rendering said actuating system operative as to the parallel contacts, and a valve or valves controlled by the reversing-switch-operating means for admitting air to the operating means of said pneumatically-operated valve.

11. In a series-parallel motor-controller of the separately-actuated-contact type, pneumatically-operated contacts, a pneumatically-operated reversing-switch, a pneumatic actuating system, means controlled by the operating means of the reversing-switch for rendering said actuating system operative as to the series contacts, a pneumatically-operated valve for rendering said actuating system operative as to the parallel contacts, and means controlled by the reversing-switch-operating means for controlling the operation of said pneumatically-operated valve, two pipes through which compressed air is supplied to the reversing-switch-operating means, to the contact-operating means, and to the operating means of said valve, and a master controlling-valve for regulating the supply of air to said pipes.

12. In a system of motor control, a motor-controller comprising a plurality of separately-actuated contacts with pneumatic operating means therefor, pneumatic maintaining means therefor, means for controlling the operating means, and means operatively related to said operating means for controlling said maintaining means.

13. In a system of motor control, a motor-controller comprising a plurality of separately-actuated contacts with pneumatic operating means therefor, a pneumatic actuating system connected therewith, pneumatic means for maintaining said contacts after the pressure in the actuating system has been reduced so as to render the operating means inoperative.

14. In a system of motor control, a motor-controller comprising a plurality of separately-actuated contacts with pneumatic operating means therefor, a pneumatic actuating system connected therewith, pneumatic means for maintaining said contacts after the pressure in the actuating system has been reduced so as to render the operating means inoperative, and a master controlling device for regulating the admission of compressed air to and the increase and reduction of pressure in said actuating system.

15. In a system of motor control, a motor-controller comprising a plurality of separately-actuated contacts with pneumatic operating means therefor, means for producing an automatic progressive operation of said operating means, pneumatic maintaining means controlled by said operating means, a master controlling device for said operating means, and means whereby the extent and rate of progression of said contacts may be directly controlled from said master controlling device.

16. In a system of motor control, a motor-controller comprising a plurality of separately-actuated contacts with pneumatic operating means therefor, means for producing an automatic progressive operation of said operating means, pneumatic maintaining means, controlled by said operating means, a master controlling device for said operating means, an actuating system connecting said operating means and said master controlling device, the latter being constructed so as to reduce the pressure in said actuating system a predetermined amount to check the automatic progression.

17. In a pneumatically-operated electric switch, a movable contact, a piston connected to said contact capable of being operated at a predetermined pressure, means for increasing the effective area of said piston to produce a maintaining means which will maintain said movable contact after the pressure has been reduced below that at which the operating-piston in set to operate.

18. In a motor-controller of the separately-actuated-contact type, a plurality of pneumatically-actuated contacts including an operating-piston for each contact, means for producing an automatic progressive action of said contacts, and means for increasing the effective area of each operating-piston as the contact operates whereby the contacts may be maintained at a lower pressure than that required to operate them.

19. In a motor-controller of the separately-actuated-contact type, a plurality of pneumatically-actuated contacts including an operating-piston for each contact, means for producing an automatic progressive action of said contacts, means for increasing the effective area of each operating-piston as the contact operates whereby the contacts may be maintained at a lower pressure than that required to operate them, and means for reducing the pressure of compressed air acting upon said pistons to check the automatic progression without affecting the contacts already operated.

20. In a motor-controller of the separately-actuated-contact type, a plurality of pneumatically-actuated contacts including an operating-piston for each contact, means for producing an automatic progressive action of said contacts, means for increasing the effective area of each operating-piston as the contact operates whereby the contacts may be maintained at a lower pressure than that required to operate them, and a master controlling-valve for controlling the pressure of the compressed air acting upon said pistons in such a manner that said automatic progressive action may be checked at any desired point without affecting the contacts already operated.

21. In a motor-controller, a plurality of switches, a piston for operating each switch, means for producing an automatic progressive operation of said switches, and means for increasing the effective area of each piston as its switch is operated.

22. In a motor-controller, a plurality of switches, a piston for operating each switch, a cylinder in which each piston operates, means for controlling the admission of compressed air to the first of these cylinders, means for producing an automatic progressive operation of said switches, and means for increasing the effective area of each piston as its switch operates.

23. In a motor-controller, a plurality of switches, a piston for operating each switch, a cylinder in which each piston operates, means for controlling the admission of compressed air to the first of these cylinders, means for producing an automatic progressive operation of said switches, means for increasing the effective area of each piston as its switch operates, and means for reducing the pressure in said cylinders so as to check said automatic progressive operation without affecting the switches already operated.

24. In a motor-controller, a plurality of switches, a piston for operating each switch, a cylinder in which each piston operates, means for controlling the admission of compressed air to the first of these cylinders, means for producing an automatic progressive operation of said switches, a maintaining-piston for each switch of greater area than said operating-piston, a cylinder in which said maintaining-piston operates, and means for admitting compressed air to said last-mentioned cylinder as the switch operates.

25. In a motor-controller, a plurality of switches, a piston for operating each switch, a cylinder in which each piston operates, means for controlling the admission of compressed air to the first of these cylinders, means for producing an automatic progressive operation of said switches, means for increasing the effective area of each piston as its switch operates, and a master controlling-valve provided with means for partially exhausting the compressed air admitted to said cylinders to check said automatic progressive operation without affecting the contacts already operated.

26. In a motor-controller, a plurality of switches, a piston for operating each switch, a cylinder in which each piston operates, means for controlling the admission of compressed air to the first of these cylinders, means for producing an automatic progressive operation of said switches, means for increasing the effective area of each piston as its switch operates, and a master controlling-valve provided with means for partially exhausting the compressed air admitted to said cylinders to check said automatic progressive operation without affecting the contacts already operated, and also provided with means for causing the complete exhaustion of said cylinders to permit the contacts to assume their initial positions.

27. In a motor-controller of the separately-actuated-contact type, series, parallel and resistance-controlling contacts, pneumatic operating means for said contacts, pneumatic maintaining means adapted to hold said contacts in their operated position with less pressure than is required to operate them, and means for producing an automatic progressive operation of said contacts through series and parallel.

28. A motor-controller of the separately-actuated-contact type having series, parallel and resistance-controlling contacts, pneumatic operating means for said contacts, pneumatic maintaining means adapted to hold said contacts in their operated position with less pressure than is required to operate them, and means for producing an automatic progressive operation of said contacts through series and parallel, in combination with means for partially exhausting the compressed air supplied to said operating and maintaining means to check said automatic progression at any desired point without affecting the contacts already operated.

29. A motor-controller of the separately-actuated-contact type having series, parallel and resistance-controlling contacts, pneumatic operating means for said contacts, pneumatic maintaining means adapted to hold said contacts in their operated position with less pressure than is required to operate them, and means for producing an automatic progressive operation of said contacts through series and parallel, in combination with a master controlling-valve including means for partially exhausting the compressed air supplied to said operating and maintaining means to check said automatic progression at any desired point without affecting the contacts already operated.

30. A switch, a piston for operating said switch, and means for increasing the effective area of said piston as the switch is operated whereby the switch may be maintained in its operated position with less pressure than is required to operate it.

31. A switch, a piston for operating said switch, a cylinder in which said piston operates, means for controlling the admission of compressed air to said cylinder to operate said piston, and means for increasing the effective area of said piston as the switch operates.

32. A switch, an operating-piston and a maintaining-piston therefor, the maintaining-piston being of greater area than the operating-piston, cylinders in which said pistons operate, and means operatively related to said operating-piston for controlling the admission of compressed fluid to the cylinder in which said maintaining-piston operates.

33. In a system of train control, each of a plurality of cars having a motor-controller comprising a plurality of separately-actuated contacts with pneumatic operating means therefor, and means for producing an automatic progressive operation of said operating means, in combination with a pneumatic train system including but two train-pipes and a master-valve and means whereby the extent and rate of progression of said contacts may be directly controlled from said master-valve.

34. In a system of train control, each of a plurality of cars having a motor-controller comprising a plurality of separately-actuated contacts with pneumatic operating means therefor, and means for producing an automatic progressive operation of said operating means, two train-pipes, and a master-valve for connecting said train-pipes to a source of compressed-fluid supply, the arrangement of parts being such that the rate and extent of the automatic progressive operation of said operating means may be controlled through said two train-pipes from said master-valve.

35. In a system of train control, each of a plurality of cars having a plurality of pneumatically-actuated contacts, pneumatic means for maintaining each contact in its operated position with less pressure than is required to operate it, means for producing an automatic progressive operation of said contacts, and a pneumatic train system operatively related to the contact operating and maintaining means.

36. In a system of train control, each of a plurality of cars having a motor-controller comprising a plurality of separately-actuated contacts, a piston for operating each contact, means for producing an automatic progressive operation of said contacts, and means for increasing the effective area of each piston as its contact is operated, in combination with a pneumatic train system which is operatively related to said pistons.

37. In a system of train control, each of a plurality of cars having a motor-controller comprising a plurality of separately-actuated contacts, a piston for operating each contact, means for producing an automatic progressive operation of said contacts, means for increasing the effective area of each piston as its contact operates, train-pipes operatively related to said contact-operating means, and a master controlling-valve controlling the supply of air from a source of supply to said train-pipes.

38. In a system of train control, each of a plurality of cars having a motor-controller comprising a plurality of separately-actuated contacts, a piston for operating each contact, means for producing an automatic progressive operation of said contacts, means for increasing the effective area of each piston as its contact operates, train-pipes operatively related to said contact-operating means, and a master controlling-valve controlling the supply of air from a source of supply to said train-pipes, said valve being also provided with means for partially exhausting said train-pipes to check the automatic progressive operation of said contacts at any desired point.

39. In a system of motor control, a plurality of motors, a series-parallel motor-controller comprising a plurality of separately-actuated contacts, pneumatic operating means for said contacts, means controlled by the contact-operating means for producing an automatic progressive operation of said operating means, a reversing-switch, pneumatic operating means therefor, two pipes connected to the reversing-switch-operating means and the contact-operating means, and means for controlling the admission of compressed fluid from a source of supply to said pipes so that series and parallel connections of the motors in forward and reverse directions of rotation may be obtained.

40. In a system of train control, a plurality of motor-cars each equipped with a plurality of motors, a series-parallel motor-controller of the separately-actuated-contact type, and a reversing-switch, pneumatic operating means for the controller-contacts and reversing-switch, means controlled by the contact-operating means for producing an automatic progressive operation of said contact-operating means, two train-pipes, connections between the train-pipes and the reversing-switch and contact-operating means of each car, and a master-controller for regulating the admission of compressed fluid from a source of supply to said train-pipes, the whole being so arranged that series and parallel connections of the motors in forward and reverse direction may be obtained.

In witness whereof I have hereunto set my hand this 7th day of April, 1905.

CHARLES E. LORD.

Witnesses:
LAURENT LOWENBERG,
M. DEARNESS.